(12) United States Patent
Carter

(10) Patent No.: US 8,996,686 B2
(45) Date of Patent: Mar. 31, 2015

(54) CONTENT DELIVERY VALIDATION SERVICE

(75) Inventor: Stephen R. Carter, Spanish Fork, UT (US)

(73) Assignee: Novell, Inc., Provo, UT (US)

(*) Notice: Subject to any disclaimer, the term of this patent is extended or adjusted under 35 U.S.C. 154(b) by 829 days.

(21) Appl. No.: 13/051,027

(22) Filed: Mar. 18, 2011

(65) Prior Publication Data

US 2012/0239801 A1 Sep. 20, 2012

(51) Int. Cl.
| G06F 15/173 | (2006.01) |
| H04N 21/226 | (2011.01) |
| H04N 21/24 | (2011.01) |
| H04N 21/2543 | (2011.01) |
| H04N 21/258 | (2011.01) |
| H04N 21/61 | (2011.01) |
| H04N 21/8352 | (2011.01) |

(52) U.S. Cl.
CPC ....... *H04N 21/2265* (2013.01); *H04N 21/2407* (2013.01); *H04N 21/2543* (2013.01); *H04N 21/25841* (2013.01); *H04N 21/25866* (2013.01); *H04N 21/6125* (2013.01); *H04N 21/8352* (2013.01)
USPC ............ 709/224; 709/223; 709/225; 709/226

(58) Field of Classification Search
CPC .................................................. H04L 12/2602
USPC .................................................. 709/223–226
See application file for complete search history.

(56) References Cited

U.S. PATENT DOCUMENTS

| 6,925,493 | B1 * | 8/2005 | Barkan et al. ................. 709/223 |
| 7,085,288 | B2 * | 8/2006 | Taylor .......................... 370/468 |
| 7,243,054 | B2 | 7/2007 | Rappaport et al. |
| 2002/0194324 | A1 * | 12/2002 | Guha ........................... 709/223 |
| 2006/0230165 | A1 | 10/2006 | Zimmer et al. |
| 2008/0102749 | A1 * | 5/2008 | Becker ......................... 455/3.06 |
| 2008/0201465 | A1 * | 8/2008 | Jones et al. ................... 709/224 |
| 2008/0243923 | A1 * | 10/2008 | Mazor et al. ............... 707/104.1 |
| 2009/0222506 | A1 | 9/2009 | Jeffery et al. |
| 2010/0027443 | A1 | 2/2010 | LoGalbo et al. |
| 2010/0281167 | A1 * | 11/2010 | Musman et al. .............. 709/226 |

* cited by examiner

*Primary Examiner* — Mohamed Wasel
(74) *Attorney, Agent, or Firm* — Schwegman Lundberg & Woessner, P.A.

(57) ABSTRACT

A Request for content is validated for a specific level of service that is to be provided over a network when making the request for the content and when delivering the content to satisfy the request over the network. A network transaction is tagged representing the request and the delivery of the content. Resources that comport with the specific level of service are designated to handle the network transaction and the transaction is injected into the network. Usage of the resources is monitored as the network transaction is processed.

20 Claims, 4 Drawing Sheets

CONTENT DELIVERY VALIDATION SERVICE

BACKGROUND

The concerns over net neutrality and the future of the Internet in terms of Internet access, bandwidth availability, and feasible business plans have resulted in concerns expressed by Internet Service Providers (ISPs), backbone providers, and Internet consumers.

Advocates of net neutrality assert that there should be no restrictions by ISPs and governments on content, sites, platforms, the kinds of equipment that may be attached, and the modes of communication used on the Internet.

As the public debate rages on net neutrality it seems that the future will likely hold a need to be able to provide basic Internet access as well as premium Internet access and possibly various levels of intervening access. Existing proposals assert that premium network access would be obtained by paying additional subscription fees. Such a scenario surely entails providing premium infrastructure by both ISPs and backbone providers.

One harbinger to the issues faced by ISPs and backbone providers is with the explosion of portable devices connecting to the Internet. In fact, recently the last set of Internet Protocol (IP) addresses was doled out, such that no more are available. Now, a newer version of the IP is being deployed, referred to as IPv6 to accommodate the exponential growth of devices connecting over the Internet. This issue only highlights the bandwidth concerns of the Internet as more and more devices communicate over the network.

Moreover, with high definition video becoming the norm and the ability to steam television broadcasts, the infrastructure issues are going to come more to the fore; and although tremendous advances in bandwidth have occurred, bandwidth availability is still a finite commodity.

Content providers, ISPs, and backbone providers are willing to spend large sums of capital as an investment to improve bandwidth but also want the ability to have different pricing structures for different levels of user access and service to their infrastructure for purposes of recouping on the investment.

Issues related to such scenarios for ISPs and backbone providers include: how to provide a guaranteed Quality of Service (QoS) for premium infrastructure use, how to track such usage, how to manage the usage, and how to price for the usage.

SUMMARY

Various embodiments of the invention provide techniques for content delivery validation service. Specifically, a method for validating content delivery is provided.

A content selection for content is received from a principal and a level of infrastructure service is identified to provide the principal when requesting and delivering the content over a network between a target device location associated with the principal and a source device location that vends the content. Next, a path is resolved through the network for requesting and delivering the content. The path and resources used along the path meet or exceed the level of infrastructure service. A request for the content is then injected into the network over the path as a network transaction and the network transaction is metered to ensure the level of infrastructure service is met during processing of the network transaction.

DETAILED DESCRIPTION

Figure 1:
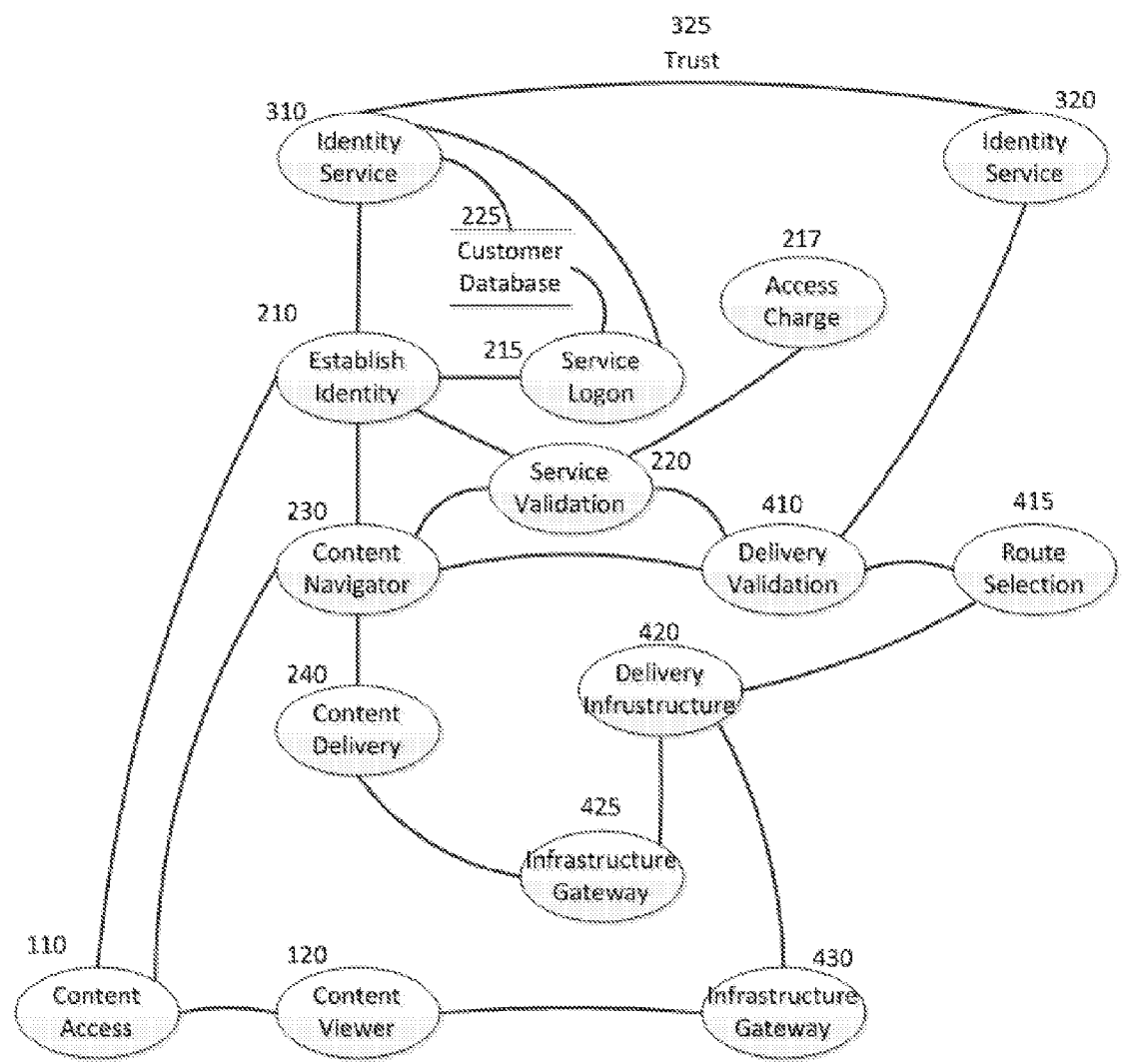
FIG. 1 is a relationship diagram for components of a content delivery validation system, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

"Content" refers to text, audio, video, graphics, images, or various combinations of these things.

An "infrastructure provider" refers to one or more entities providing hardware and/or software resources for network transactions. An example infrastructure provider includes an ISP, a backbone provider, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

An "agreement" refers to a data structure that embodies contractual obligations of an enterprise, which can be translated into processing that is then interpreted and enforced. A Service Level Agreement (SLA) is one such type of agreement, a software license is another, others can exist as well.

Various embodiments of this invention can be implemented in existing network architectures. For example, in some embodiments, the techniques presented herein are implemented in whole or in part in the Novell® operating system products, directory-based products, cloud-computing-based products, workload management products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Embodiments and components of the invention are implemented and reside in a non-transitory computer-readable medium that executes on one or more processors that are specifically configured to process the embodiments and components described herein and below.

FIG. 1 is a relationship diagram for components of a content delivery validation system, according to the techniques presented herein. It is noted that the FIG. 1 is presented for purposes of illustration and comprehension. It is to be understood that other arrangements and/or components can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a variety of specific example situations that an enterprise and users can encounter. These are presented for purposes of illustration only, as other situations can occur as well and still benefit from the techniques presented herein and below.

At 110 (Content Access), a user or agent has a need to access content over the Internet. Whether that content is data, text, or media is irrelevant (as defined above). The need to access such content over a privileged infrastructure is the pertinent aspect of the access desired by the user/agent.

The user/agent may navigate content directly, at 230, (Content Navigator) or may establish an identity, at 210, (Establish Identity) before navigating for the content. It is noted that the processing depicted at 230 is for navigating secondary content, such as titles, summaries, etc. rather than accessing the primary content (full video selection, full audio, selection etc.) itself. An example of this is navigating a list of movies that are streamed over the Internet. In this embodiment, the Content Navigator uses a non-privileged infrastructure because bandwidth, security, response time, etc. is of no import.

At 210 (Establish Identity) performs either a Service Login (at 215) or obtains an identity from an Identity Service (at 310). It is noted that the processing at 215 may affect a login for the user/agent either from a Customer Database (at 225) or via the Identity Service (at 310).

When the user/agent selects content to be accessed at 230, the validity of the service to provide the content is verified by Service Validation (at 220). At this point, the processing at 220 may determine that the account that the user/agent is using does not have enough funds in it to affect the content transfer over a privileged infrastructure. If this is true, Access Charge (at 217) is invoked to obtain additional funds to provide the delivery of the content. The processing at 220 also places restrictions on the content delivery, such as time or number of bytes to be delivered (e.g. if the movie were being vended and the movie was 93 min. long a time restriction of 120 min. may be placed on the connection through privileged infrastructure so that some replay could be performed during the movie while providing the privileged infrastructure provider with some indication of the amount of privileged resources that are going to be consumed).

The processing at 220 also invokes Delivery Validation (at 410), which is a mechanism at the privileged infrastructure provider to inform the privileged infrastructure provider that the utilization of privileged infrastructure is authorized and has been paid for (or will be paid for if the subscription for utilization is based on a billing model that allows the accrual of usage charges). The processing at 410 has access to an Identity Service (at 320), which is in a trust relationship with other Identity Services, such as shown at 325 where the identity of the user/agent (which may be anonymous) can be validated. This Identity Service validation may be in lieu of any indication from 220 of the validity of the transfer request.

In either case, the request from 222 to 410 may result in a request to 415 Route Selection to specify the appropriate route through the privileged infrastructure based upon the subscription information provided by 220, and in an embodiment validated by 320. The purpose of 415 is to select a route that is commensurate with the type of privileged infrastructure that has been authorized. The infrastructure provider may have several levels of privileged infrastructure (e.g., Enhance Internet Access, Premium Internet Access, Ultra Internet Access, Ultra-premium Internet Access, etc.) and an appropriate route is determined to utilize the appropriate resources. It is noted that the request in no way prohibits the infrastructure provider from providing better service than what has been requested but that an agreement will require some SLA to govern the content that is to be delivered.

The processing at 410 may provide 220 with information that should be inserted into the content request (such as a token that can identify content requests with the validation that was confirmed). The processing at 220 is then informed by 230 of the information necessary; and in an embodiment, provide the access address or Virtual Private Network (VPN) information for the infrastructure gateway.

The processing at 230 passes the information to the Content Delivery (at 240), which accesses the appropriate Infrastructure Gateway (at 425) and which, according to information in the request (such as the token that was provided earlier or a specific endpoint IP address, which will be especially efficacious using IPv6 since endpoint addresses will be plentiful, etc.) will then access the Delivery Infrastructure (at 420), which utilizes the route information to access another Infrastructure Gateway through the privileged infrastructure at 430 to deliver content to the Content Viewer (at 120).

It is well to note that in an end-to-end delivery of content (such as a streaming movie) that the source of the content and the sink of the content will be well known for a long period of time. However, embodiments of the techniques presented herein also provide for browsing through content throughout the Internet where the source of the content may be changing. In this case, the Delivery Infrastructure (at 420) may be determining new routes and/or endpoints within the privileged infrastructure of 415 dynamically and providing them to Infrastructure Gateway (at 425 or at 430) as needed. Providing endpoint information to Infrastructure Gateway (at 430) may be necessary if the endpoint address of the content viewer (at 120) is changing because the viewing mechanism is changing geographic locations (e.g. playing a movie in a car or in an airplane).

In an embodiment, Delivery Infrastructure (at 420) is a consortium of any backbone providers and/or ISPs to provide a premium service through premium infrastructure where the consortium shares in the payment to deliver the content.

Because the route can be determined at 415 and/or a token has been provided by 410, the actual utilization of the premium infrastructure can be metered by 420 even if the privileged infrastructure spans multiple backbone and/or ISP providers.

Figure 2:
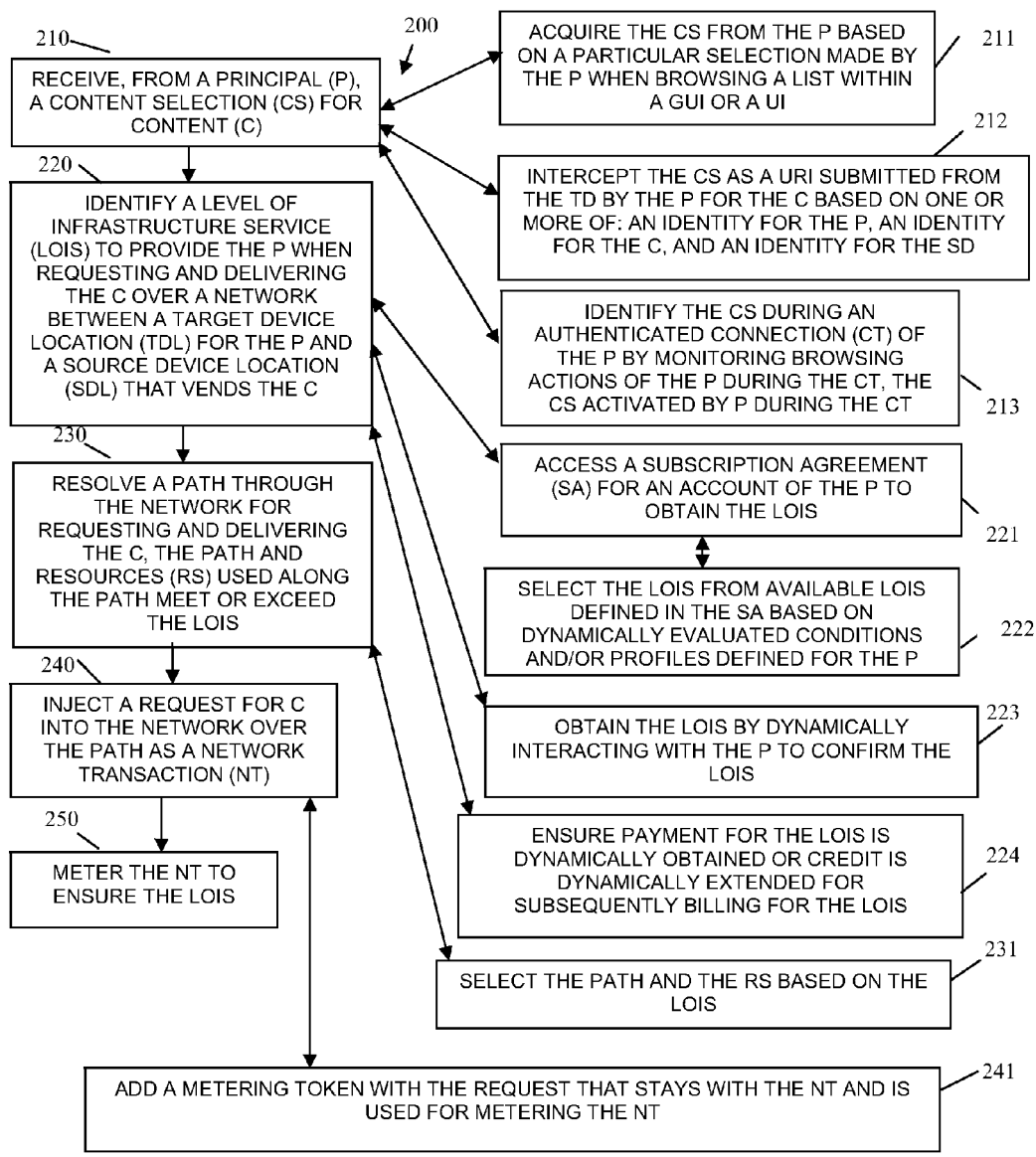
FIG. 2 is a diagram of a method for validating content delivery, according to an example embodiment.

FIG. 2 is a diagram of a method 200 for validating content delivery, according to an example embodiment. The method 200 (hereinafter "content delivery and validation manager") is implemented and resides within a non-transitory computer-readable or processor-readable medium that executes on one or more processors of a network. Moreover, the content delivery and validation manager is operational over a network and the network may be wired, wireless, or a combination of wired and wireless.

At 210, the content delivery and validation manager receives from a principal a content selection for content. The principal can be a user interacting via a target device or an automated agent (service) that processes on a target device. The content selection is a reference to the content, such as an identifier, a link, etc. The manner in which the content selection is received by the content delivery and validation manager can occur in a variety of ways.

For example, at 211, the content delivery and validation manager acquires the content selection from the principal based on a particular selection made by the principal when the principal is browsing a list within a Graphical User Interface (GUI) or other User Interface (UI). This list includes metadata or secondary information describing the content along with other content. Examples of this embodiment were presented above with the discussion of the FIG. 1 and with reference to item 230 of the FIG. 1.

In another case, at 212, the content delivery and validation manager intercepts the content selection as a Uniform Resource Identifier (URI) submitted from a target device (e.g., computer, laptop, tablet, phone, television enabled for network access, etc.) used by the principal. The URI is a link activated by the principal, such as via a browser, and is intercepted and inspected by the content delivery and validation manager to determine if the URI is to be associated with a network transaction that is to be processed using a specific level of service. This can be done by inspecting such things as an identity of the principal, and identity associated with the content, and/or an identity associated with a source device that is to vend the content. Policy can then be evaluated to make a determination of the network transaction is to be handled with a specific level of service or handled in a normal or non special manner.

In yet another situation, at 213, the content delivery and validation manager identifies the content selection during an authenticated connection of the principal by monitoring browsing actions of the principal during the authenticated connection and the content selection activated by the principal during the authenticated connection. Here, the content delivery and validation manager may be part of a network service that provides enhanced processing for content requests and delivery via special set aside resources and the principal can take advantage of such service by authenticating to the service and then browsing the Internet or a network normally such that when requests for content is made, the requests are identified and processed over the Internet via a specific level of service (discussed above and more completely below with reference to the processing of the FIG. 2 at 220).

At 220, the content delivery and validation manager identifies a level of infrastructure service to provide the principal when requesting and delivering the content over a network (such as the Internet) between a target device location associated with the principal and a source device location that vends the content being requested via the content selection. Here, both sending the request for the content to the source device location and then receiving back the content at the target device location are processed according to the level of infrastructure service. The "level of infrastructure service" can be customized by infrastructure providers (service providers, backbone infrastructure providers, and the like) to provide enhanced network processing via specific resources or via specific functions of specific resources of the network. For example, a minimum bandwidth for completing the network transaction (sending the request for the content and receiving the content) may be defined by the level of infrastructure service. A certain level of security for the network transaction may also be part of the level of infrastructure service, such that certain processing nodes are used over others, certain security measures, protocols, or techniques are used over others, and the like. Even specific resources may be part of the level of service. Some generic levels of infrastructure service were discussed above with reference to the FIG. 1. The level of infrastructure service can be customized by the infrastructure providers and provided as subscriptions to customers or applications that customers process.

According to an embodiment, at 221, the content delivery and validation manager accesses a subscription agreement for an account of the principal to obtain the level of infrastructure service.

Continuing with the embodiment of 221 and at 222, the content delivery and validation manager selects the level of infrastructure service from a plurality of available levels of infrastructure services defined in the subscription agreement based on dynamic evaluated conditions and/or profile settings defined for the principal. In other words, a variety of factors (such as identities for the principal, target device, source device, content, infrastructure provider, etc.) can be considered in real time to pick a particular desired level of infrastructure service from a list of available levels of service defined in a subscription agreement for the principal.

In one case, at 223, the content delivery and validation manager obtains the level of infrastructure service by dynamically interacting with the principal to confirm the level of infrastructure service. So, when a different level of infrastructure service is detected as being an option to the principal, the content delivery and validation manager can present the option to the principal for selection. When the principal is a user, this can be done via a popup window, for instance. When the principal is an automated agent, this can be done via an Application Programming Interface (API).

According to an embodiment, at 224, the content delivery and validation manager ensures payment for the level of infrastructure service is dynamically obtained or credit is dynamically extended for subsequent billing for the level of infrastructure service. Payment for the level of infrastructure service was discussed above with reference to the FIG. 1. Moreover, ensuring payment may also include just ensuring that an existing annual or monthly subscription is up to date and covers the expense associated with the level of infrastructure service. In other cases, the payment can be immediately acquired in a pay as you use scenario. In yet more cases, credit can be extended to a principal if permitted.

At 230, the content delivery and validation manager resolves a path through the network (such as the Internet) for both initially requesting and subsequently delivering the content. The path and resources used along the path meet or exceed the level of infrastructure service. Thus, resources are identified and validated for handling a network transaction that both submits the request and processes the request. The resources combine to at a minimum meet the required level of infrastructure service. It is noted that the level of service can be exceeded but at a minimum meets the agreed to level of service.

In an embodiment, at 231, the content delivery and validation manager selects the path and the resources based on the level of infrastructure service.

At 240, the content delivery and validation manager injects a request for the content into the network over the path using the resources as the network transaction on behalf of the principal.

In an embodiment, at 241, the content delivery and validation manager also adds a metering token with the request that stays with the network transaction and is used for a variety of purposes, such as: validating to the resources that the network transaction is legitimate and it to receive the given level of infrastructure service, measuring usage at each one of the resources along the path when processing the network transaction, tracking the performance of the network transaction as a whole, and the like. Other examples of the token and its usage were presented above with reference to the FIG. 1 as well.

At 250, the content delivery and validation manager meters the network transaction to ensure the level of infrastructure service is being met and to monitor the usage of each of the resources when the network transaction is processed.

Figure 3:
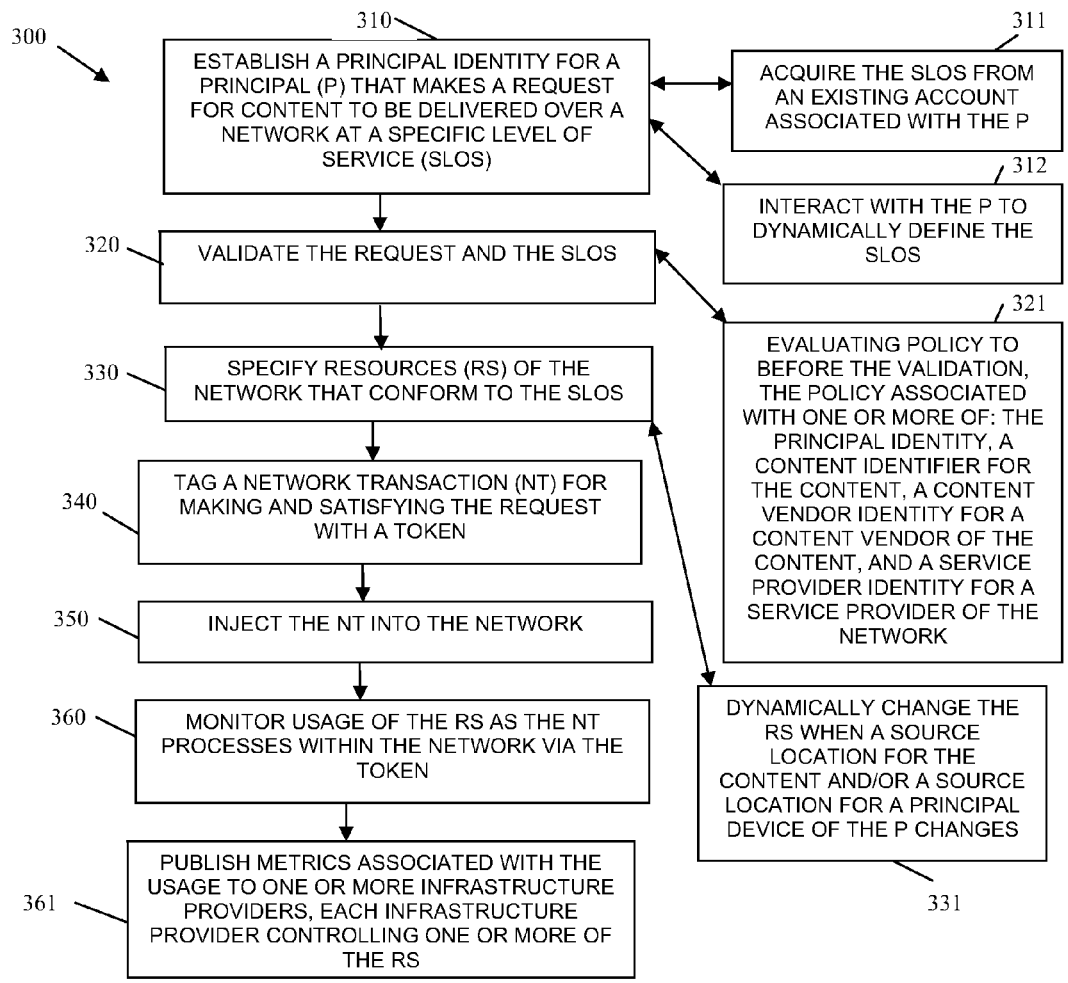
FIG. 3 is a diagram of another method for validating content delivery, according to an example embodiment.

FIG. 3 is a diagram of another method 300 for validating content delivery, according to an example embodiment. The method 300 (hereinafter "delivery service") is implemented and resides within a non-transitory computer-readable or processor-readable medium that executes on one or more processors of a network. Moreover, the delivery service is operational over a network and the network may be wired, wireless, or a combination of wired and wireless.

The delivery service presents another and in some cases enhanced perspective of the content delivery and validation manager represented by the method 200 of the FIG. 2 and discussed in detail above.

At 310, the delivery service establishes a principal identify for a principal that makes a request for content that is to be delivered over a network (such as the Internet) at a specific level of agreed upon service, which may or may not include specific resources and specific resource metrics. Basically, the principal is authenticated to an identity and that identity is tied to the specific level of service.

According to an embodiment, at 311, the delivery service acquires the specific level of service from an existing account associated with the principal. This account may be tied to the delivery service or to a specific infrastructure provider (such as an ISP). In some cases, the delivery service is integrated into an ISP environment while in other cases the delivery service can service multiple ISP's or infrastructure providers.

In another situation, at 312, the delivery service interacts with the principal (either via GUI's for a principal that is a user or via an API for a principal that is an automated agent) for purposes of dynamically defining the specific level of service. This scenario can occur when the principal has an account and wants to change the level of service or can occur when no account exists and one is being created or a pay as you go scenario exists.

At 320, the delivery service validates the request and the specific level of service. In other words, identities are tied to the request and the specific level of service and policy is evaluated to validate that the request and the specific level of service is permissible. Example scenarios associated with validation were provided above with reference to the FIG. 1.

For example, at 321, the delivery service can evaluate policy before the validation where the policy is associated with one or more of: the principal identity, a content identifier for the content, a content vendor identity for a content vendor or distributor of the content, and/or a service provider identity for a service provider of the network being used or being requested for use by the principal in connection with making the request and acquiring the content over the network at the specific level of service.

At 330, the delivery service specifies resources of the network that conform to the specific level of service. This may be achieved via a notification to infrastructure providers that the resources are needed and receiving acknowledgment back that the resources have been partitioned for the transaction or set aside for the transaction. In some cases, the delivery service may control from of the needed resources directly, in which case the partitioning or setting aside can be directly achieved via API instructions from the delivery service to the resources. It may also be a situation where some resources are specified directly by the delivery service and other resources are specified via interaction with API's of the infrastructure providers that control those other resources.

According to an embodiment, at 331, the delivery service dynamically changes the resources or some of the resources when a source location for the content and/or source location for a principal device of the principal changes. This was explained above with reference to the FIG. 1 and can occur when the principal device or the device vending the content is moving or changing on the network. In the case of the principal, the principal may be in a plane or a car such that the device for which the request originates is continually changing necessitating a dynamic change in the resources as the network transaction is processed. The content provider may also have multiple locations from which to acquire the content such that when the principal device changes so does the content providing device. In still another scenario, the network transaction may entail a content provider that is another principal that has the content on his/her device and that device is traveling as well. The point is that dynamic adjustments to the resources used for the specific level of service can be made by the delivery service.

At 340, the delivery service tags a network transaction for making and satisfying the request with a token. Again, the usage of the token and some information that the token can entail was discussed above with reference to the FIGS. 1 and 2.

At 350, the delivery service injects the network transaction into the network using the resources that are configured to provide the specific level of service for the network transaction. The network transaction includes both the request for the content and delivery of that content.

At 360, the delivery service monitors the usage of the resources as the network transaction processes within the network, via or using the token as a tracking mechanism and validation mechanism.

In an embodiment, at 361, the delivery service publishes metrics associated with the usage to one or more infrastructure providers. Each infrastructure provider controlling one or more of the resources used in providing the specific level of service. Here, the resources for providing the specific level of service for the network transaction may be owned and/or controlled by multiple different entities such that the publication of the metrics permits each of these entities to keep track of usage of their controlled resources for purposes of pricing, billing, load balancing, and the like.

Figure 4:
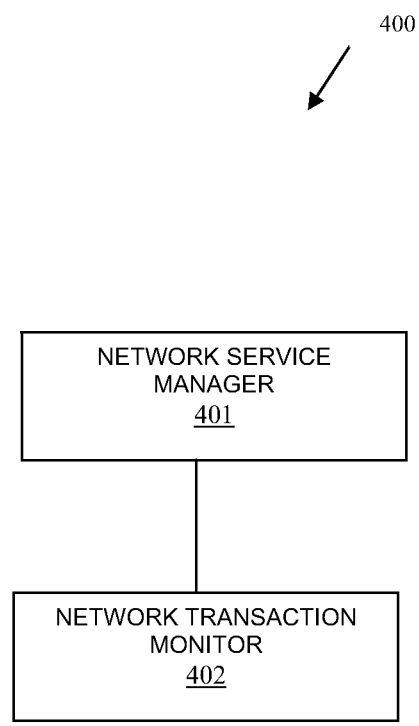
FIG. 4 is a diagram of a content delivery validation system, according to the techniques presented herein.

FIG. 4 is a diagram of a content delivery validation system 400, according to the techniques presented herein. The components of the content delivery validation system 400 are implemented within and reside within a non-transitory and computer or processor-readable storage medium for purposes of executing on one or more processors of a network. The network may be wired, wireless, or a combination of wired and wireless.

The content delivery validation system 400 implements, inter alia, various aspects of the FIG. 1, and the method 200 and the method 300 of the FIGS. 2 and 3, respectively.

The content delivery validation system 400 includes a network service manager 401 and a network transaction monitor 402. Each of these components and their interactions with one another will now be discussed in detail.

The network service manager 401 is implemented and programmed within a non-transitory computer-readable storage medium for execution on one or more processors of a network. The processor(s) specifically configured to execute the network service manager 401. Example aspects of the network service manager 401 were provided above with reference to the FIGS. 1-3.

The network service manager 401 is configured to authenticate a principal and request for content for processing over the network at a specific level of service. The request for the content and the delivery of the content together form a network transaction. The network service manager 401 also configured to identify resources of the network to process the network transaction and to tag the network transaction with a token before the network transaction is injected into the network for processing on behalf of the principal.

According to an embodiment, the network service manager 401 is configured to ensure payment is obtained from the principal or credit is extended to the principal for subsequent payment before the network transaction is injected into the network for processing.

In another case, the network service manager 401 is configured to notify one or more infrastructure providers of the resources that are planned to be used for the network transaction before the network transaction is injected into the network for processing on behalf of the principal.

The network transaction monitor 402 is implemented and programmed within a non-transitory computer-readable storage medium for execution on one or more processors of a network. The processor(s) specifically configured to execute the network transaction monitor 402. Example aspects of the network transaction monitor 402 were provided above with reference to the FIGS. 1-3.

The network transaction monitor 402 is configured to monitor usage of the resources, via the token, as the network transaction is processed.

According to an embodiment, each resource is also configured to use the token to validate that it is permissible for that resource to process the network transaction.

It may also be the case that the network transaction monitor 402 or other entities assist, via the token, in validating the network transaction as it traverses the network via the resources.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
identifying a level of infrastructure service to provide a principal when the principal sends a content selection for content and when the content is delivered to the principal over a network between a target device location associated with the principal and a source device location that vends the content, wherein the level of infrastructure service is customized by an infrastructure provider and the level of infrastructure service at least includes: using a minimum bandwidth for sending the content selection over the network and deploying a certain level of security for the sending the content selection over the network, wherein the certain level of security includes using certain processing nodes over other nodes available, deploying certain security measures over other security measures available, and deploying certain protocols over other protocols available;
resolving a path through the network for requesting and delivering the content, the path and resources used along the path meet or exceed the level of infrastructure service;
injecting a request for content into the network over the path as a network transaction; and
metering the network transaction to ensure the level of infrastructure service.

2. The method of claim 1, wherein identifying further includes acquiring the content selection from the principal based on a particular selection made by the principal when browsing a list within a Graphical User Interface (GUI) or other User Interface (UI), the list including metadata or secondary data describing the content along with other content.

3. The method of claim 1, wherein identifying further includes intercepting the content selection as a Uniform Resource Identifier submitted from the target device by the principal for the content based on one or more of: an identity for the principal, an identity for the content, and an identity for the source device.

4. The method of claim 1, wherein identifying further includes identifying the content selection during an authenticated connection of the principal by monitoring browsing actions of the principal during the authenticated connection, and the content selection activated by the principal during the authenticated connection.

5. The method of claim 1, wherein identifying further includes accessing a subscription agreement for an account of the principal to obtain the level of infrastructure service.

6. The method of claim 5, wherein accessing further includes selecting the level of infrastructure service from a plurality of available levels of infrastructure services defined in the subscription agreement based on dynamically evaluated conditions and/or profile settings defined for the principal.

7. The method of claim 1, wherein identifying further includes obtaining the level of infrastructure service by dynamically interacting with the principal to confirm the level of infrastructure service.

8. The method of claim 1, wherein identifying further includes ensuring payment for the level of infrastructure service is dynamically obtained or credit is dynamically extended for subsequently billing for the level of infrastructure service.

9. The method of claim 1, wherein resolving further includes selecting the path and the resources based on the level of infrastructure service.

10. The method of claim 1, wherein injecting further includes adding a metering token with the request that stays with the network transaction and is used for metering the network transaction.

11. A method implemented in a non-transitory machine-readable storage medium and processed by one or more processors configured to perform the method, comprising:
- establishing a principal identity for a principal and identifying a specified level of service based on the principal identity, and receiving a request from the principal for content to be delivered over a network at the specific level of service, and the request received from the principal using the specific level of service, wherein the specified level of service is also customized by an infrastructure provider, and the level of infrastructure service at least includes: using a minimum bandwidth for delivering the content selection over the network and deploying a certain level of security for the delivering the content selection over the network, wherein the certain level of security includes using certain processing nodes over other nodes available, deploying certain security measures over other security measures available, and deploying certain protocols over other protocols available;
- validating the request and the specific level of service;
- reserving resources of the network that conform to the specific level of service;
- tagging a network transaction for making and satisfying the request with a token;
- injecting the network transaction into the network; and
- monitoring usage of the resources as the network transaction processes within the network via the token.

12. The method of claim 11, wherein establishing further includes acquiring the specific level of service from an existing account associated with the principal.

13. The method of claim 11, wherein establishing further includes interacting with the principal to dynamically define the specific level of service.

14. The method of claim 11, wherein validating further includes evaluating policy to before the validation, the policy associated with one or more of: the principal identity, a content identifier for the content, a content vendor identity for a content vendor of the content, and a service provider identity for a service provider of the network.

15. The method of claim 11, wherein reserving further includes dynamically changing the resources when a source location for the content and/or a source location for a principal device of the principal changes.

16. The method of claim 11, wherein monitoring further includes publishing metrics associated with the usage to one or more additional infrastructure providers, each infrastructure provider controlling one or more of the resources.

17. A system, comprising:
- a network service manager implemented in a non-transitory computer-readable storage medium and to execute on one or more processors of a network; and
- a network transaction monitor implemented in a non-transitory computer-readable storage medium and to execute on one or more processors of the network;
- the network service manager configured to authenticate a principal and acquire a specific level of service based on authentication and the service manager configured to receive a request for content from the principal, the request received and the content delivered using the specific level of service and the content is delivered over the network, the request and the delivery of the content together form a network transaction, the network service manager also configured to identify resources of the network to process the network transaction and to tag the network transaction with a token before the network transaction is injected into the network for processing, the network transaction monitor is configured to monitor usage of the resources, via the token, as the network transaction is processed, and wherein the level of service is customized by an infrastructure provider, provider and the level of infrastructure service at least includes: use of a minimum bandwidth to deliver the content selection over the network and to deploy a certain level of security to deliver the content selection over the network, wherein the certain level of security includes use of certain processing nodes over other nodes available, deploy certain security measures over other security measures available, and deploy certain protocols over other protocols available.

18. The system of claim 17, wherein the network service manager is configured to ensure payment is obtained from the principal or credit is extended before the network transaction is injected into the network for processing.

19. The system of claim 17, wherein each resource is configured to also use the token to validate that it is permissible for that resource to process the network transaction.

20. The system of claim 19, wherein network service manager is configured to notify one or more additional infrastructure providers of the resources that are planned to be used for the network transaction before the network transaction is injected into the network for processing.

* * * * *

UNITED STATES PATENT AND TRADEMARK OFFICE
CERTIFICATE OF CORRECTION

| | | |
|---|---|---|
| PATENT NO. | : 8,996,686 B2 | Page 1 of 1 |
| APPLICATION NO. | : 13/051027 | |
| DATED | : March 31, 2015 | |
| INVENTOR(S) | : Stephen R. Carter | |

It is certified that error appears in the above-identified patent and that said Letters Patent is hereby corrected as shown below:

Title Page

Item (57), in "Abstract", in column 2, line 1, delete "Request" and insert --request--, therefor

Claims

In column 12, line 26, in Claim 17, after "provider,", delete "provider", therefor Signed and Sealed this
Seventeenth Day of November, 2015

Michelle K. Lee
*Director of the United States Patent and Trademark Office*